Nov. 28, 1950   R. H. DICKE   2,532,060
ELECTROSTATIC VIBRATION DETECTOR
Filed May 27, 1946   2 Sheets-Sheet 1

INVENTOR.
R. H. Dicke
BY Oscar H. Dicke
His ATTORNEY

Nov. 28, 1950          R. H. DICKE          2,532,060
ELECTROSTATIC VIBRATION DETECTOR
Filed May 27, 1946          2 Sheets-Sheet 2
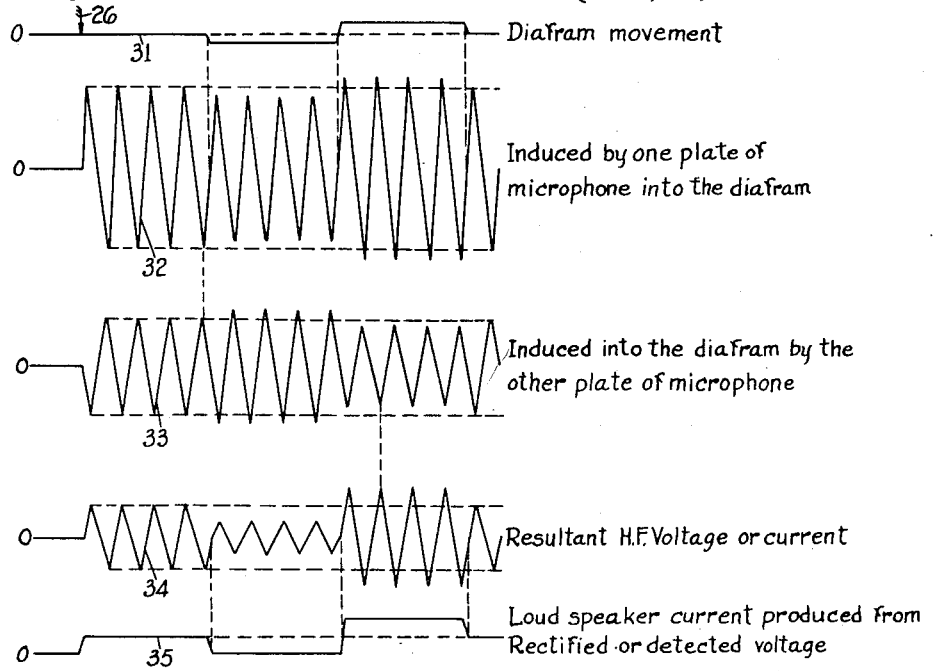
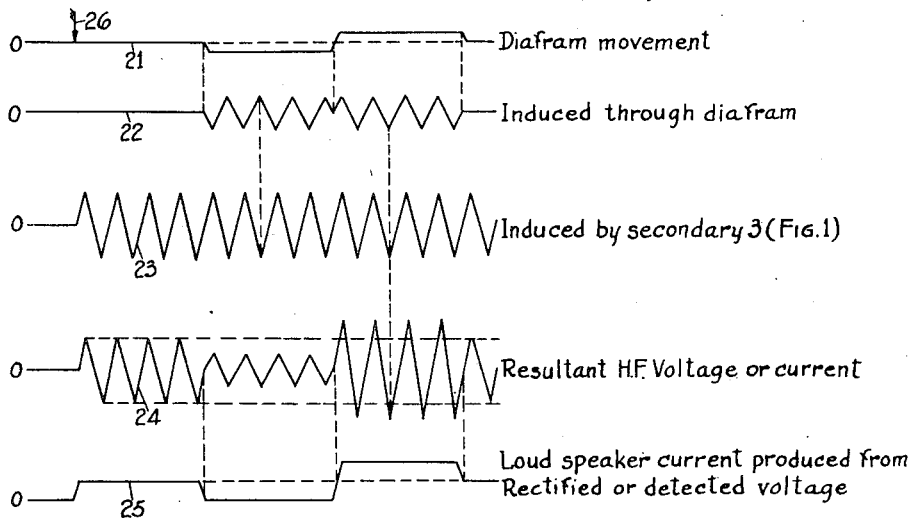
INVENTOR.
R. H. Dicke
BY
Oscar H. Dicke
His ATTORNEY Patented Nov. 28, 1950

2,532,060

UNITED STATES PATENT OFFICE 2,532,060

ELECTROSTATIC VIBRATION DETECTOR

Robert H. Dicke, Princeton, N. J.

Application May 27, 1946, Serial No. 672,678

10 Claims. (Cl. 332—30)

This invention relates to apparatus for measuring electrically small deflections and may more particularly be applied to electro-phonographic pick-up or microphone structures but also has application in the construction of devices for measuring extremely small mechanical displacements as could for instance be used in testing and weighing machines.

In accordance with the present invention it is proposed to obtain current flow in substantial volume in accordance with the minute deflection or displacement of a plate or diaphragm with respect to two fixed plates with a minimum of distortion between the extent of such deflection or displacement and the variation in current produced thereby.

Another object of the present invention under a particular adjusted condition contemplates the provision of means for producing current flow in one relative direction when the plate or diaphragm moves in one direction and produce current flowing in the opposite relative direction when the plate or diaphrgam moves in the opposite direction.

Another object of the present invention resides in the provision of means to produce a relatively high frequency alternating current through a condenser having spaced plates between which there is located a diaphragm of conducting material whereby vibration of the diaphragm in the direction of the electro-static field produced between said plates will cause potentials with respect to the neutral point of a winding producing such fields to be induced on said diaphragm, as it is vibrated, and to combine these induced potentials in a circuit with a substantially constant carrier potential of the same frequency and of constant phase, whereby the resultant potential is modulated in character in accordance with the vibration of such diaphragm.

Another object of the present invention resides in the provision of two circuits each conducting high frequency current and having a common portion in which these two currents flow in opposite directions, which circuits include two condensers which have a common plate or diaphragm which as it moves in one direction increases the capacity of one condenser and decreases the capacity of the other and as it moves in the other direction increases the capacity of said other condenser and decreases the capacity of said one condenser.

Another object of the present invention resides in the provision of two circuits each conducting high frequency current and having a common portion comprising an inductance and having a multiple portion including a condenser in each portion of which a diaphragm constitutes a common plate of each of said condensers, whereby the tuned relationship of the two circuits may be changed in opposite directions for each vibration of the diaphragm.

Another object of the present invention resides in the creation of a high frequency alternating electro-static field having an imaginary plane of zero potential with respect to a common wire and in the provision of a conducting diaphragm or plate substantially parallel thereto but displaced from the imaginary plane to an extent to produce a comparatively small high frequency potential relative to said common wire during non-vibration of said diaphragm whereby vibration of said diaphragm or plate will cause said relatively small potential to be modulated in accordance with the vibration of such diaphragm or plate. Other objects, purposes and characteristic features of the present invention will in part be pointed out in the following specification and will in part become apparent from the accompanying drawings of which:

Figure 5:
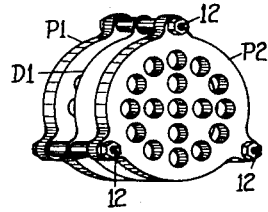
Figure 6:
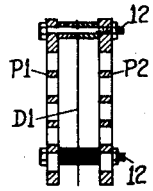
Figure 7:
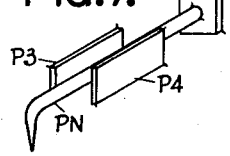
Figure 8:
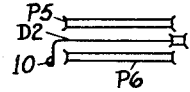
Figure 4:
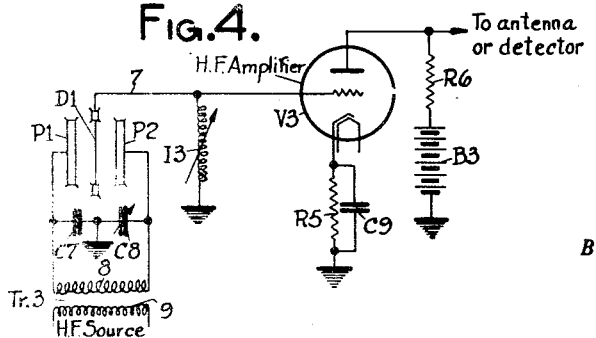

Fig. 4 illustrates still another modification, which is the preferred embodiment of the present invention, and in which the normal flow of carrier current is derived and adjusted through the medium of two condensers, one of which is preferably adjustable, connected in series and across the high frequency source so that the capacity relationship of the two condensers will determine the carrier frequency potential existing between the condenser junction and the diaphragm, to in turn determine the extent of normal carrier current flow in an external circuit;

Figs. 5 and 6 illustrate in perspective and cross-sectional elevation, respectively, of the mechanical portion of a microphone embodying the present invention;

Figs. 7 and 8 illustrate forms of the mechanical portion of the invention when applied to phonograph pick-up and minute mechanical measurement purposes respectively; and Figs. 9 and 10 are operational time charts for the forms of invention shown in Fig. 1 and Figs. 2, 3 and 4 respectively.

Figure 1:
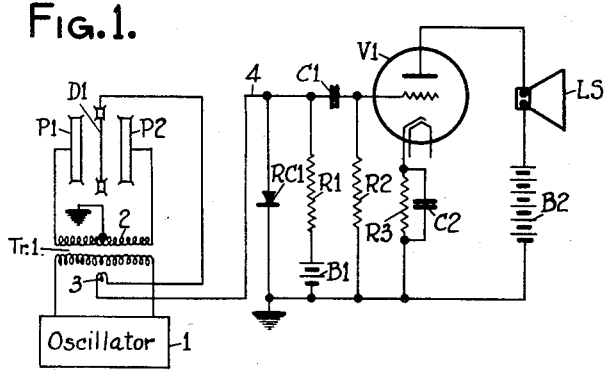
Fig. 1 illustrates conventionally one embodiment of the present invention wherein the normal carrier current is induced by separate means.

In Fig. 1 the oscillator 1 may be of any well known construction which generates by electronic tube oscillation a high frequency current, of say 5 megacycles, and applies it to the primary winding of the air core transformer Tr1, having secondary windings 2 and 3. The secondary winding 2 preferably has its midpoint grounded and has its two ends connected to the comparatively heavy plates P1 and P2 of a novel microphone unit including a diaphragm D1. If now this microphone unit is of symmetrical construction, as it is assumed to be, there will be no potential difference between diaphragm D1 and ground. If, however, this diaphragm is bulged slightly in one direction a potential appears between this diaphragm and ground and this potential is of the same frequency as that generated by the oscillator 1 and applied to transformer Tr1. If now the diaphragm 1 is bulged slightly in the opposite direction the high frequency potential existing between diaphragm D1 and ground is of the same frequency but of reverse phase from what existed there before. That is, it is displaced 180 degrees in phase. These potentials are electrostatically induced upon diaphragm D1 by plates P1 and P2 and the secondary winding 2.

In order to have these induced potentials produce opposite modulation effects in synchronism with movement of the diaphragm D1 they are combined, one or both at a time, with a third potential induced electro-magnetically in the circuit by secondary winding 3, suitable means being provided, if necessary, to bring the potential induced in secondary winding 3 in perfect phase and phase opposition, respectively, with the two potentials which may be induced between diaphragm D1 and ground. The sum or difference, as the case may be, of these potentials, the potential induced in secondary winding 3 being the greater, is then applied to an amplifier or detector, as the case may be. In Fig. 1 it has been shown applied to the crystal detector or rectifier Rc1. In order to cause this detector Rc1 to effect non-distortional rectification a battery B1 is connected through resistance R1 across this rectifier Rc1. The potential of this battery is sufficient to break down the forward resistance of the rectifier Rc1 and causes a small direct current to continuously flow. It is readily seen that under normal conditions the high frequency voltage induced in secondary winding 3 will produce current which is rectified by rectifier Rc1 and is drained off and that the unrectified portion of the waves will build up potential at the upper terminal of this rectifier in accordance with the modulation of the high frequency potential resulting from the two high frequency potentials in series. That is, the potential from ground to diaphragm D1 and the potential induced by secondary winding 3 in series. These modulations vary, of course, in magnitude with the vibration of the diaphragm D1. As shown in Fig. 1 this modulation potential is then applied through blocking condenser C1 to the audio amplifier tube V1 having the usual grid (leak) resistance R2. The usual grid bias resistance R3 is by-passed by audio by-pass condenser C2. The plate circuit of this tube V1 includes a loud speaker LS and a plate battery B2. It is, of course, understood that other forms of amplifying and detecting means may be employed and that the high frequency potential appearing at the output wire 4 may be amplified before it is detected and that such amplification may be accomplished by first mixing it with a heterodyning frequency after which the intermediate frequency resulting therefrom is amplified.

In this Fig. 1 construction the values of the inductances and condensers in the high frequency circuit is preferably so chosen that the circuit is tuned to that frequency. That is, the circuit starting at ground and including the left half of secondary 2 and condenser P1—D1 in series and having in multiple therewith a circuit portion including the right half of secondary 2 and condenser D1—P2 in series, from whence the circuit continues through secondary winding 3 and rectifier Rc1 to ground, is preferably a tuned circuit.

Figure 2:
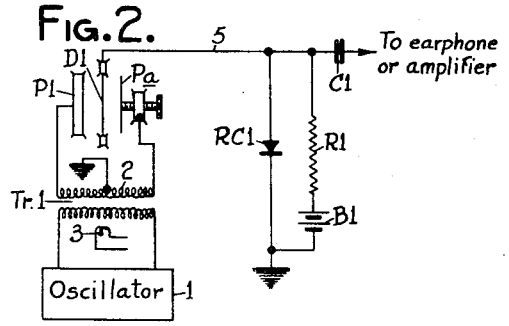
Fig. 2 illustrates a modified form of the invention in which the normal flow of high frequency or carrier current is derived and adjusted through the medium of an adjustable microphone condenser plate.

The modification shown in Fig. 2 is identical to the construction shown in Fig. 1 with the exception that the secondary winding 3 has been omitted, left unused and the microphone plate 2 has been replaced by an adjustable plate Pa. In this form the normal high frequency potential, formerly derived from secondary winding 3, is derived by adjusting the adjustable plate Pa to a point where the desired high frequency carrier current is delivered with the diaphragm D1 in its normal at-rest position by making the capacity of condenser D1—Pa either slightly larger or slightly smaller than the capacity of condenser P1—D1. In this construction, like the construction illustrated in Fig. 1, the various constants of the circuit through the microphone P1—D1—P2 and the rectifier Rc1 are also preferably so chosen that this constitutes a tuned circuit for the carrier frequency employed under average conditions when in use. That is, the inductive reactance of the left half of secondary winding 2 is neutralized by the capacity reactance of the condenser P1—D1 and the inductive reactance of the right half of second winding 2 is neutralized by capacity reactance of condenser D1—Pa.

Figure 3:
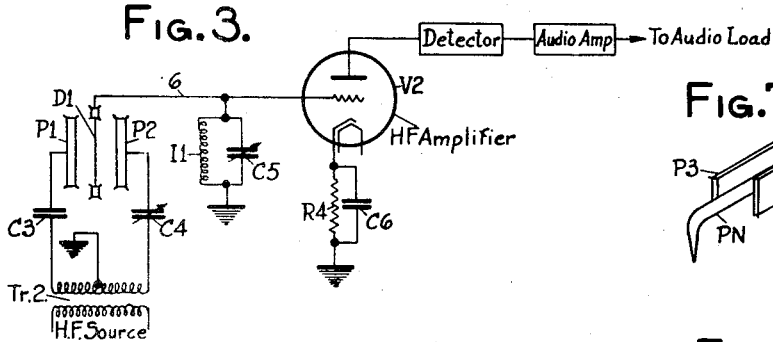
Fig. 3 illustrates another modified form of the invention in which the normal flow of carrier current is derived and adjusted through the medium of an adjustable series condenser.

In the Fig. 3 construction the apparatus to the left of wire 6 is the same as that shown to the left of wire 5 of Fig. 2 with the exception that the adjustable microphone plate Pa has been replaced by the fixed plate P2 and that two condensers C3 and C4 have been included in series respectively with the left half and the right half of microphone condenser P1—D1—P2. The condenser C4 is preferably adjustable as conventionally shown by the associated arrow. This condenser C4 is so constructed, or so adjusted, that even though the condenser microphone is of symmetrical construction a normal carrier current will be caused to flow over wire 6 because one of the two circuit portions in multiple including these respective condensers will deliver a greater potential to its associated plate P1 or P2 than will the other. This circuit over wire 6 has its various constants preferably so chosen that it constitutes a substantially tuned circuit, precaution being taken that sufficient impedance is encountered at inductance I1 to deliver a substantial voltage at the grid of the high frequency amplifier tube V2. If this inductance I1 is properly chosen with regard to the tube capacity the condenser C5 may be omitted. Also, if desired, the high frequency amplifier V2 may be replaced by a detector amplifier such as tube V1 of Fig. 1 and its associated resistances and condensers, in which case the detector and audio amplifier shown will be omitted. In this circuit the inductance I1 and its associated condenser consisting of the tube capacity plus the capacity of condenser C5, if used, is such as to establish approximately potential resonance over I1—C5 between wire 6 and ground so that a substantial potential is applied to the grid of tube V2. The rest of the circuit, namely from ground through the microphone to wire 6 has its condensers and inductances so chosen as to establish current resonance with I1—C5. Inductance I1 then also serves as a grid leak. It should, however, be understood that if condenser C4 is adjusted to the same capacity as that of condenser C3 no voltage will be induced in the ciriuit including wire 6 during the normal position of the diaphragm D1 because the diaphragm D1 will lie in the same potential zone as does the ground connection in the circuit including the microphone P1—D1—P2, condensers C3 and C4 and secondary winding 2 in series. The condenser C4 is, however, in practice adjusted to deliver a high frequency carrier current that is at least of such magnitude that it will not be brought to zero during maximum vibration of the diaphragm D1 and maximum modulation of the carrier current. Vibration of the diaphragm will, therefore, cause modulation of the carrier current, and the rectification of this carrier current will result in a modulated direct current the modulations of which conform substantially precisely to the vibration of the diaphragm and if applied to a loudspeaker will cause the speaker diaphragm to repeat the diaphragm D1 with the exception that the vibration will be of greater amplitude.

Let us now refer to Fig. 4 which shows the preferred form of applicant's invention. In this form of the invention the secondary winding 8 of the transformer Tr3 is not grounded at its midpoint as is true of the structures shown in Figs. 1, 2 and 3 of the drawings. In this form of applicant's invention the secondary winding 8 is substantially tuned to the frequency of the high frequency source H. F. by the condensers C7 and C8 in series having in multiple therewith the microphone condensers P1—D1 and D1—P2 in series. The condenser C8 is preferably adjustable so that the ground connection at the junction of these condensers C7 and C8 may have its potential off-set slightly with respect to the potential existing at the diaphragm D1, so that a net potential difference between this ground connection and the diaphragm D1 exists when the diaphragm is at rest. In this form of the invention the portion of the circuit to the left of wire 7 and through ground is substantially condensive so that the circuit to the right of wire 7 may be mostly inductive to obtain a circuit tuned to current resonance. For this reason a variable inductance I3 has been provided. This variable inductance preferably has a total inductance when properly adjusted such as to cause the circuit extending from the ground connection between condensers C7 and C8 through wire 7 and inductance I3 to resonate at the high frequency of the source applied to the primary winding 9 of transformer Tr3. To obtain the desired resonance proper consideration is, of course, given to the internal capacity of the tube V3. Grid bias such as is desired to be used is obtained in the preferred construction of Fig. 4 through the medium of series cathode resistance R5 which is shunted by condenser C9 of a size and capacity to pass the radio frequency current. A plate battery B3 and series plate resistance R6 for resistance coupling purposes also have been shown. In this form of the invention the condenser C8 is so adjusted that with the diaphragm D1 at rest sufficient carrier current will flow through the circuit including wire 7 that it will not be modulated to zero upon maximum deflection of the diaphragm D1. As illustrated by legend in Fig. 4 the output of the amplifier including tube V3 may be applied directly to an antenna if desired or it may be applied to a detector and converted to audio current before it is transmitted to a speaker or other receptor.

In each of the forms of the invention illustrated in Figs. 2, 3 and 5 the diaphragm D1 of a microphone is so located in a condenser potential gradient of high frequency potential that a potential difference between it and ground or between it and a cathode of an amplifier tube exists, with the diaphragm assuming its neutral position. It is, therefore, evident that this potential difference will be increased if the diaphragm is forced in one direction but will be decreased if the diaphragm is moved in the opposite direction. In order to produce corresponding nondistorted variations of, or modulations of, high frequency potentials on the grid of an amplifier tube as those existing on the diaphragm itself in spite of variable energy consumption in the grid circuit this potential difference is set to work to produce a correspondingly modulated current flow in a circuit including an impedance, the potential drop across which impedance is applied to such grid of an amplifier. Stating this in somewhat different language the diaphragm D1 should not be directly connected to the grid of an amplifier because the rectifying action of the grid would clog the grid, so to speak. If a grid leak only were used the rectifying action of the grid could produce distortion. It is, therefore, proposed that a substantially tuned load circuit fed by the potential difference between diaphragm D1 and ground be used, and that the potential drop over an impedance in this load circuit be applied to the input or grid of an amplifier. The same may be said in regard to the Fig. 1 construction, but in this case the normal carrier current is due to the potential induced by secondary winding 3. Another decided advantage of applicant's invention may be attributed to the fact that vibration of the diaphragm D1 in any one of the four forms of the invention illustrated, although it does change the capacity of two condensers, namely P1—D1 and D1—P2, it does not materially change the tuning of any circuit. This vibration or bending of the diaphragm changes relative quantity of plus and minus voltages acting on the diaphragm D1 of conducting material. This also reduces distortion and is an efficient structure for converting small deflections into large currents and potentials. Investigation shows that deflections as small as one ten-millionth of an inch produce accurate and undistorted response. The high frequency, preferably about five million cycles per second employed enables the induction of substantial currents in the circuits including wires 4, 5, 6 and 7 in spite of the three plate condenser microphone of small capacity that is used.

The 3-plate condenser microphone P1—D1—P2 illustrated in Figs. 1, 3 and 4 has been illustrated in perspective in Fig. 5 and in cross-sectional side elevation in Fig. 6. These views disclose the structure adequately so that no specific description is believed necessary. It should, however, be observed that the plates P1 and P2 and diaphragm D1 are constructed of conducting material and are insulated from each other and are firmly held together by means of three compression bolts 12 passing through insulating sleeves and insulating washers. In some forms of the mechanical portion of this microphone only one of the two plates is perforated to avoid pick-up from the rear. Both plates have been shown perforated in Figs. 5 and 6. These plates P1 and P2 are sufficiently thick to prevent their vibration.

Fig. 7 shows a similar 3-plate condenser construction but in this form the middle member is preferably pivoted, by spring pivot, at one end as shown and is provided with a phonograph needle PN at the other end.

The Fig. 8 structure is similar to that shown in Fig. 7 and distinguishes therefrom mainly by the provision of a small loop 19 at the end of a spring pivoted diaphragm D2 in place of the phonograph needle PN of Fig. 7. These three elements P3, PN and P4 must, however, be insulated from each other in a manner similar to that shown in Figs. 5 and 6. The loop 19 is used for connecting a small wire or string thereto for measuring small mechanical displacements.

It is believed unnecessary to describe the operation of the microphone or phonograph pick-up of applicant's invention in that its operation is obvious from the detailed description of its construction and from the description of Figs. 9 and 10. It may, however, be stated that any slight sidewise movement of the diaphragm (up and down movement in Fig. 8) results in a shift of 180° of phase of a portion of the current flowing from this diaphragm and this shift of phase results in either an increase or a decrease in the high frequency current flowing toward the detector or amplifier and this change in current is directly proportional to the extent and direction of such sidewise movement of the diaphragm and, therefore, does not result in distortion but instead results in accurate conversion of mechanical modulation into electric current modulation.

If applicant's novel measuring condenser is to be used as a temperature measuring instrument the flat strip D2 of Fig. 8 may be constructed of bi-metal consisting of two thin strips of metal having different temperature coefficients of expansion and welded together. In this structure a rise in temperature would bend the bi-metallic strip D2 in one direction whereas a fall in temperature would bend it in the opposite direction. Obviously, the high frequency current after being amplified and rectified would be applied to an ammeter or a relay depending upon whether the temperature difference is to be indicated or is to be used to control some other device, respectively. Obviously, the invention may also be applied to scales of various types by having the weight, to be measured, bring one or more pairs of plates toward each other whereas other associated pairs of plates are moved apart.

In Figs. 9 and 10 have been illustrated operational time charts for the forms of invention shown in Fig. 1 and Figs 2, 3, and 4. respectively. Although some of the curves of mechanical modulation, voltage and current are different in Figs. 9 and 10 it will be seen that graphs 21, 24 and 25 are identical to graphs 31, 34 and 35, respectively. In Fig. 10 the graphs 32 and 33 represent the voltages induced into diaphragm D1 individually by the plates P1 and P2 whereas the resultant voltage induced (shown by graph 34) only has been shown by graph 22 in Fig. 9. The graph 22 differs from graph 34 by reason of the fact that no net potential above ground is present on the diaphragm D1 of Fig. 1 when in its normal at-rest position (see first portion of graph 22), whereas a net potential of two units above ground is impressed on the diaphragm D1 of the Figs. 2, 3 and 4 construction (see first portion of graph 34). If, however, the steady potential induced by the secondary winding 3 of Fig. 1 (see graph 23) is added to the potential with respect to ground present on diaphragm D1 (see graph 22) the resultant potential will be the same as the potential induced on the diaphragm D1 of Figs. 2, 3 and 4 (graph 34) as is evidenced by graph 24.

Referring now to Fig. 9 it will be seen from curves 21 and 22 that, as the diaphragm D1 is moved down a high frequency potential is induced upon the diaphragm with respect to ground as shown directly below on curve 22 and that if this diaphragm is moved above its neutral at-rest position a similar high frequency voltage displaced 180° in phase (reverse polarity) is induced in this diaphragm (see right-hand portion of curves 21 and 22). As shown in Fig. 1 the secondary winding 3 induces a steady voltage (graph 23) in series with the voltage between diaphragm D1 and ground (graph 22) to obtain the resultant voltage or current (graph 24). If now the current or voltage of graph 24 is rectified a modulation current such as shown by graph 25 will result. The graph 25 is identical to graph 21 insofar as its variations are concerned, particularly after that point where the set is turned on as shown by arrow 26, except that the magnitude has been increased as shown by the heights of the graphs 21 and 25.

Referring now to Fig. 10, in the forms of invention shown in Figs. 2, 3 and 4 the secondary winding 3 is not used and in this form the voltages of reversed polarity (note reversed polarity of graphs 32 and 33) induced upon diaphragm D1 by plates P1 and P2 (Pa, Fig. 2) are unbalanced and produce a net voltage as shown by the left-hand portion of graph 34 and this net voltage is decreased and increased as the diaphragm (graph 31) is moved down and up respectively (graph 34). If this high frequency voltage or current of graph 34 is rectified (detected) a modulated direct current such as shown in graph 35 is obtained.

Having thus shown and described numerous forms of the invention it should be understood that the particular forms illustrated which were selected to aid in the description of the underlying principles of the invention, do not exhaust all possible forms that the invention may take and it should be understood, for instance, that if phase modulation instead of amplitude modulation is desired all that is necessary is to adjust the phase of the voltage induced through the medium of secondary winding 3 (Fig. 1) so that this voltage is displaced substantially ninety electrical degrees with respect to the voltages that may be induced through the medium of plates P1 and P2. Since these latter voltages are displaced in phase substantially 180° with respect to each other the phase of the voltage induced by one or the other of these plates will cause a phase shift in the voltage delivered to a carrier frequency amplifier and this phase shift may vary substantially through an angle from minus 90° to plus 90° with zero phase shift existing when the diaphragm is in its normal position. Also, any one of the deflection response or deflection measuring devices shown in Figs. 5, 7 or 8 may be used in any one of the systems shown in Figs. 1, 2, 3, or 4 and if desired any one of the systems shown in Figs. 1, 2, 3 and 4 may amplify, detect or broadcast by carrier frequency responses to the diaphragm DI, and it should be understood that other changes, modifications or additions may be made to any form of the invention without departing from the spirit or scope of the invention so long as these changes come within the scope of the following claims.

What I claim as new is:

1. A displacement responsive device of the condenser type comprising two plates having conducting surfaces and insulated from each other, a movable member having a conducting surface and supported between said plates but insulated therefrom and movable toward one plate as it moves away from the other and movable toward the other plate as it is moved away from said one plate, a source of high inaudible frequency potential having an intermediate leadout wire, a translating means, a circuit capable of conducting high frequency current extending from said intermediate leadout wire through two paths in multiple each including a portion of said source and one of said plates and then over a single path from said movable member through said translating means back to said leadout wire, and means including said source of high frequency potential for causing a high frequency current to be induced in said circuit when said movable member is moved toward one and away from the other of said plates, whereby movement of said movable member will cause the flow of high frequency current in said circuit dependent on the extent of movement of said member.

2. Apparatus for converting sound waves into modulated current waves comprising, two spaced plates having conducting surfaces substantially parallel to each other and insulated from each other, a source of high in audible frequency potential having two main and an intermediate leadout wire and having said main leadout wires connected to said plates, a movable member having a conducting surface and located between said plates and movable transversely with respect to the plane of said plates, a partial circuit extending from said intermediate leadout wire through two paths in multiple each including the portion of said source between said intermediate leadout wire and one of said main leadout wires and one of said plates and extending to said movable member and electronic means for amplifying the potential differences between the ends of said partial circuit namely that existing between said movable member and said intermediate leadout wire.

3. Apparatus for converting mechanical modulation into modulated current waves comprising, two spaced plates having conducting surfaces substantially parallel to each other and insulated from each other, two condensers connected in series across said plates, a source of high inaudible frequency potential connected across said plates a movable member having conducting surfaces and located between said plates and movable transversely with respect to the planes of said plates, and electronic means for amplifying the high frequency potential differences existing between said movable member and the junction between said condensers, whereby the amplified potential is dependent on the position assumed by said movable member when at rest and the modulation of said potential is dependent on the movement of said movable member.

4. Apparatus for converting sound waves into modulated electric current comprising, two plates each having conducting surfaces and insulated from each other and spaced substantially parallel to each other, a movable member having a conducting surface and supported substantially parallel to and between said plates, a source of inaudible high frequency potential including a coil and having two main and an intermediate leadout wire and having one main leadout wire connected to one plate and having the other main leadout wire connected to the other plate, a translating device, a partial circuit having said translating device included therein and extending from said intermediate leadout wire to said movable member, said movable member being so spaced from said plates and said intermediate leadout wire being so located potentialwise with respect to said main leadout wires that said coil cannot induce such high frequency potential between said intermediate leadout wire and said movable member when said movable member assumes its normal position, but will induce such high frequency potential when said movable member is displaced from normal, and means for inducing unvarying potential in excess of the potential which can be induced by moving said movable member in the entire circuit including said partial circuit said coil and said plates and movable member, whereby the resultant potential is modulated as said movable member is vibrated in a direction transversely to said plates.

5. Apparatus for converting sound waves into modulated electric current comprising, two plates each having conducting surfaces and insulated from each other and spaced substantially parallel to each other, a movable member having a conducting surface and supported substantially parallel to and between said plates, a source of inaudible high frequency potential including a coil and having two main and an intermediate leadout wire and having one leadout wire connected to one plate and having the other main leadout wire connected to the other plate, a translating device, a partial circuit having said translating device included therein and extending from said intermediate leadout wire to said movable member, and means whereby if the spacing of the movable member potentialwise to said plates and the intermediate leadout wire potentialwise to said main leadout wires is properly chosen an unvarying high frequency potential is applied to said translating device when said movable member assumes its normal position and such high frequency potential applied to said translating device is modulated if said movable member is vibrated in a direction transversely to said plates.

6. A translating system of the capacitance responsive type for converting mechanical vibrations into potential variations comprising two plates having conducting surfaces at least one of which is perforated to allow the passage of sound waves therethrough and insulated from each other and located relatively substantially parallel to each other; a movable member having a conducting surface and supported between said plates but insulated therefrom and movable in response to sound waves and other audible vibrations toward one plate and away from the other or toward the other plate and away from said one plate; and a single high-frequency source of inaudible high-frequency potential connected across said plates and having an intermediate leadout wire connected through a partial circuit to said member; said plates, member and source being so electrically and electrostatically related that a low potential of said inaudible high frequency is inducted in said partial circuit when said member is at rest; whereby vibration of said movable member by sound waves or other audible vibrations will cause it to vary its proximity to opposite polarity potentials of said inaudible high-frequency source to thereby cause modulation of said low voltage potential induced in said partial circuit between said movable member and said intermediate leadout wire.

7. Apparatus for converting diaphragm oscillations into current modulations on one side of zero current only comprising, two comparatively heavy plates having conducting surfaces and insulated from each other and having a diaphragm of conducting material supported substantially parallel thereto and between said plates but insulated therefrom, a source of single frequency inaudible high-frequency potential connected across said plates and having an intermediate leadout wire dividing said source into two portions to offset said intermediate leadout wire potentially with respect to the potential on said diaphragm so that a difference of inaudible high-frequency potential exists between said diaphragm and said intermediate leadout wire when said diaphragm assumes its normal non-deflected position which difference of potential is sufficiently high so that vibration of said diaphragm can at no time reduce such potential to zero, an impedance, and a circuit extending from said diaphragm through said impedance to said intermediate leadout wire and through said two portions of said source in multiple each having a portion of the condenser formed by said plates and diaphragm in series therewith, whereby non-modulated inaudible high-frequency current flows in said circuit when said diaphragm is at rest and whereby said high-frequency current is modulated to higher and lower values on the same side of zero substantially in conformity with the movement of said diaphragm when said diaphragm is vibrating.

8. An electro-static vibration pickup comprising, two comparatively heavy plates having conducting surfaces and insulated from each other and supported substantially parallel to each other, vibration operated means including a member having conducting surfaces and supported between said plates and movable toward and away from one or the other of said plates by mechanical vibration, a source of single frequency inaudible high-frequency potential connected across said plates and having an intermediate leadout wire offset potentially with respect to said member so that a constant difference of low voltage high-frequency potential exists between said leadout wire and said member when said means is at rest but which high-frequency potential is amplitude modulated to a less extent than to zero value when said means is vibrated, an impedance, a circuit including said impedance and extending from said intermediate leadout wire through said member and through two multiple paths each including a plate and a portion of said source.

9. Apparatus for converting sound into modulated high-frequency current comprising, two spaced plates having conducting surfaces substantially parallel to each other and insulated from each other, two condensers connected in series across said plates, a source of inaudible high-frequency potential connected across said plates, a diaphragm having a conducting surface and located between said plates and movable transversely with respect to the planes of said plates, said condensers having capacities such that a constant high-frequency potential exists between said diaphragm and the junction between said condensers when said diaphragm is at rest and which is modulated when said diaphragm is vibrated.

10. An electrostatic microphone system comprising, two spaced plates having conducting surfaces substantially parallel to each other and insulated from each other, a source of inaudible high-frequency potential having two main and an intermediate leadout wire and having said main leadout wires each connected to one of said plates, a diaphragm having a conducting surface and located between said plates and movable transversely with respect to the planes of said plates, said intermediate leadout wire being so located with respect to the main leadout wires and said diaphragm being so located with respect to said plates that a constant high-frequency potential difference exists between said intermediate leadout wire and said diaphragm when said diaphragm is at rest which potential difference is modulated when said diaphragm is vibrated, and electronic means for amplifying and detecting the potential difference existing between said diaphragm and intermediate leadout wire.

ROBERT H. DICKE.

REFERENCES CITED

The following references are of record in the file of this patent:

UNITED STATES PATENTS

| Number | Name | Date |
|---|---|---|
| 1,666,738 | Hartley | Apr. 17, 1928 |
| 1,732,393 | Andrewes | Oct. 22, 1929 |
| 1,755,739 | Kositzke | Apr. 22, 1930 |
| 1,764,008 | Crozier | June 17, 1930 |
| 1,990,216 | Asch | Feb. 5, 1935 |
| 2,067,021 | Robert | Jan. 5, 1937 |
| 2,092,762 | Kroger | Sept. 14, 1937 |
| 2,386,049 | Hausz | Oct. 2, 1945 |